US010944691B1

(12) United States Patent
Raut et al.

(10) Patent No.: US 10,944,691 B1
(45) Date of Patent: Mar. 9, 2021

(54) CONTAINER-BASED NETWORK POLICY CONFIGURATION IN SOFTWARE-DEFINED NETWORKING (SDN) ENVIRONMENTS

(71) Applicant: VMware, Inc., Palo Alto, CA (US)

(72) Inventors: Abhishek Raut, San Jose, CA (US); Kai Su, Foster City, CA (US); Jianjun Shen, Redwood City, CA (US); Salvatore Orlando, Naples (IT); Tong Liu, Fremont, CA (US); Shih-Hao Li, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/742,917

(22) Filed: Jan. 15, 2020

(51) Int. Cl.
*H04L 12/26* (2006.01)
*H04L 12/911* (2013.01)

(52) U.S. Cl.
CPC .............. *H04L 47/82* (2013.01); *H04L 47/78* (2013.01)

(58) Field of Classification Search
None
See application file for complete search history.

(56) References Cited

U.S. PATENT DOCUMENTS

| 2016/0352865 | A1* | 12/2016 | Gupta | H04L 67/42 |
| 2018/0091603 | A1* | 3/2018 | Sarangapani | H04L 43/10 |
| 2018/0123951 | A1* | 5/2018 | Wang | H04L 45/74 |
| 2019/0213349 | A1* | 7/2019 | Luo | G06F 9/45558 |

* cited by examiner

*Primary Examiner* — Cai Y Chen
(74) *Attorney, Agent, or Firm* — Su IP Consulting

(57) ABSTRACT

Example methods and systems for container-based network policy configuration in a software-defined networking (SDN) environment are disclosed. One example method may comprise: in response to detecting a first request to assign a container-based resource with a first label via a container orchestration system, assigning a logical network element associated with the container-based resource with a second label. The example method may also comprise: in response to detecting a second request to configure a container-based network policy associated with the container-based resource via the container orchestration system, identifying the logical network element by mapping the first label to the second label; and configuring the container-based network policy to be applicable to network traffic that is forwarded via the logical network element.

21 Claims, 10 Drawing Sheets

US 10,944,691 B1

CONTAINER-BASED NETWORK POLICY CONFIGURATION IN SOFTWARE-DEFINED NETWORKING (SDN) ENVIRONMENTS

CROSS-REFERENCE TO RELATED APPLICATION

The present application is related in subject matter to U.S. patent application Ser. No. 16/742,919, which is incorporated herein by reference.

BACKGROUND

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines (VMs) running different operating systems may be supported by the same physical machine (e.g., referred to as a "host"). Each VM is generally provisioned with virtual resources to run an operating system and applications. The virtual resources may include central processing unit (CPU) resources, memory resources, storage resources, network resources, etc. Further, through container-based technology, multiple containers may be executed as isolated processes inside a VM. In practice, various network connectivity issues that affect the performance of containers or pods may occur in the SDN environment. However, it may be challenging to perform network diagnosis using existing tools.

DETAILED DESCRIPTION

Figure 1:
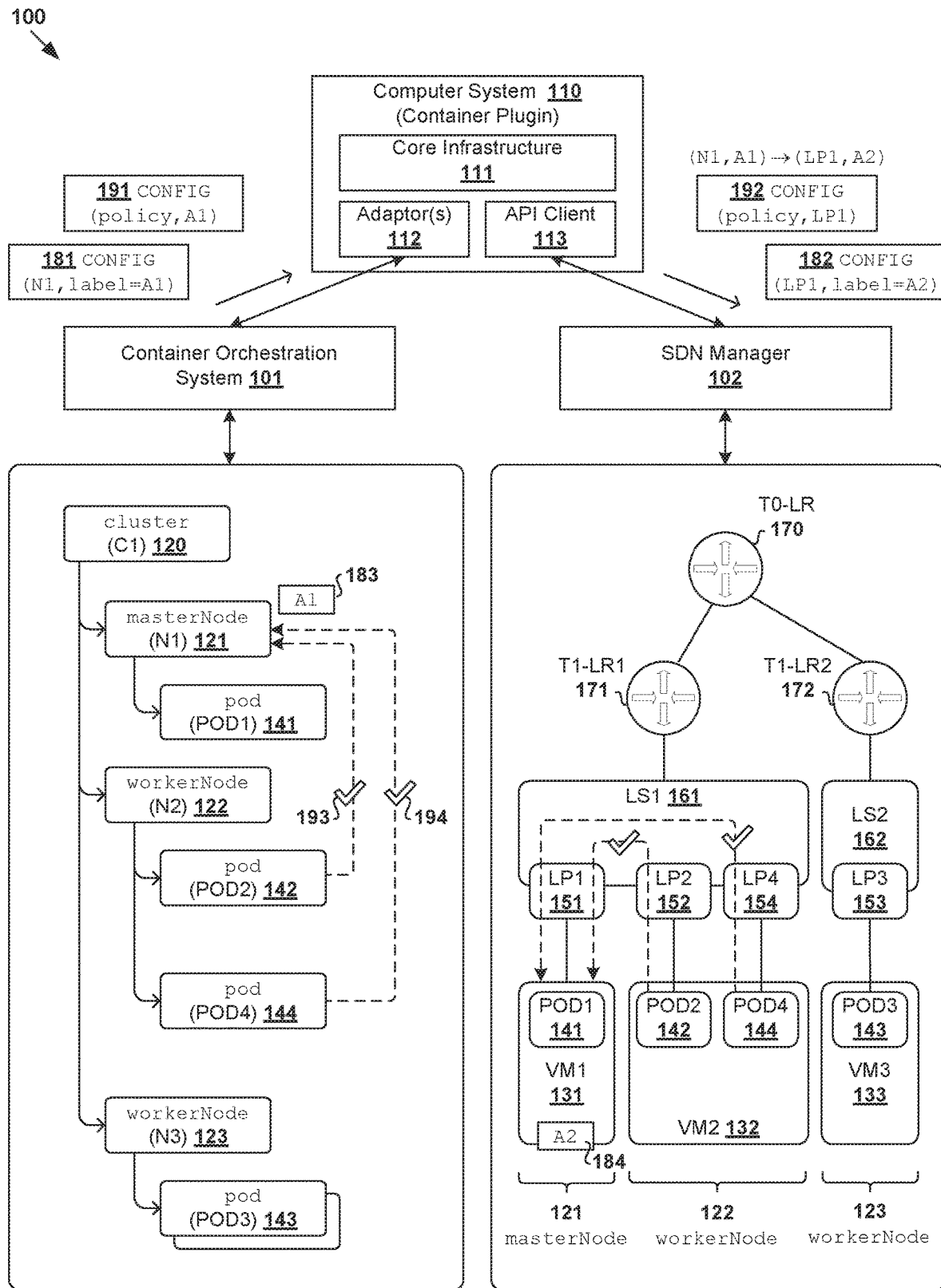
FIG. 1 is a schematic diagram illustrating an example software-defined networking (SDN) environment in which container-based network policy configuration may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first," "second" and so on are used to describe various elements, these elements should not be limited by these terms. These terms are used to distinguish one element from another. A first element may be referred to as a second element, and vice versa.

FIG. 1 is a schematic diagram illustrating example SDN environment 100 in which container-based network policy configuration may be performed. It should be understood that, depending on the desired implementation, SDN environment 100 may include additional and/or alternative components than that shown in FIG. 1. Here, computer system 110 ("container plugin") is configured to act as an interface between container orchestration systems 101 (one shown for simplicity) and SDN manager 102 of a virtualization platform. For example, container plugin 110 may monitor events on container orchestration system 101 and translate them into instructions to SDN manager 102. Any suitable network plugin may be used, such as VMware NSX® container plugin (NCP) from VMware, Inc. In practice, NSX® is an SDN virtualization and security platform that decouples networking functions from the underlying physical devices (to be discussed further using FIG. 2).

Depending on the desired implementation, container plugin 110 may implement orchestrator-specific adaptor(s) 112 to interact with container orchestration system 101, core infrastructure 111 and backend-specific application programming interface (API) client(s) 113 to interact with SDN manager 102. Orchestrator-specific adaptor 112 may periodically poll information and listen to live event streams from container orchestration system 101. Core infrastructure 111 may be configured to dispatch instructions to SDN manager 102, such as in the form of Representational State Transfer (REST or RESTful) application programming interface (API) calls, etc. Container plugin 110 may also configure networking interfaces for containers according to any suitable standard, such as Container Network Interface (CNI).

Container orchestration system 101 (also known as a container orchestration layer) may implement any suitable container technology, such as Docker Swarm®, Kubernetes®, Cloud Foundry® Diego, Apache® Mesos™, etc. In practice, Kubernetes (abbreviated as "K8s") is a container orchestration platform that is designed to simplify the deployment and management of cloud-native applications at scale. Kubernetes may be implemented to provide a container-centric infrastructure for the deployment, scaling and operations of application containers across clusters of hosts. Since its inception, Kubernetes has become one of the most popular platforms for deploying containerized applications. Kubernetes defines a networking model for its container-based resources, while the implementation of the networking model is provided by network plugins, such as container plugin 110 in FIG. 1.

As used herein, the term "container" (also known as "container instance") is used generally to describe an application that is encapsulated with all its dependencies (e.g., binaries, libraries, etc.). Containers are "OS-less", meaning that they do not include any OS that could weigh 10s of Gigabytes (GB). This makes containers more lightweight, portable, efficient and suitable for delivery into an isolated OS environment. In practice, running containers inside a virtual machine (VM) or node not only leverages the benefits of container technologies but also that of virtualization technologies.

As used herein, the term "container-based resource" or "container-orchestrator resource" may refer to an entity or object associated with a containerized application that is configurable and manageable via container orchestration system 101. Some example container-based resources are shown in FIG. 1, such as cluster (see 120), master node (see 121), worker nodes (see 122-123), pods (see 141-144), containers (i.e., member of a pod), namespaces, etc. Using Kubernetes for example, a cluster may include master node(s) and worker node(s). Each node may include multiple pods, each pod a group of one or more containers that share an IP address and a data volume. Namespaces may be configured to divide resources of a cluster amongst multiple users and/or groups.

In practice, containers are gaining popularity as a packaging unit to deploy micro-services because of their relatively small footprint compared to VMs. Using a microservice architecture, an application may be divided into multiple distinct parts that are executed independently from each other, each part being implemented using one or more containers. An application that is implemented using multiple containers may be referred to as a containerized application or cloud-native application. For example, a web-based application may be broken into a web front-end server that is implemented using front-end container(s), database server using database container(s), application server using application container(s), etc. In some cases, each part of the application may be developed by a different team with a different language.

To configure and manage container-based resources, users (e.g., network administrators) may interact with any suitable user interface supported by container orchestration system 101, such as API, command line interface (CLI), graphical user interface (GUI) or dashboard, etc. By monitoring container orchestration system 101, container plugin 110 may detect events (e.g., create, read, update and delete) associated with container-based resources and translate the desired state into necessary configuration of logical network elements via SDN manager 102.

In the example in FIG. 1, individual containers (not shown for simplicity) may be grouped as pods (see "POD1" to "POD5" 141-144) and run inside different VMs (see 131-133). Container plugin 110 may interact with SDN manager 102 to configure various logical network elements connecting the containers, such as logical routers (see 170-172), logical switches (see 161-162), logical switch ports (see 151-154), etc. As such, container plugin 110 facilitates integration between container orchestration platform 101 and SDN manager 102. In practice, container plugin 110 may be implemented using a bare metal server, or a virtualized computing instance (e.g., VM or container).

Physical Implementation View

Figure 2:
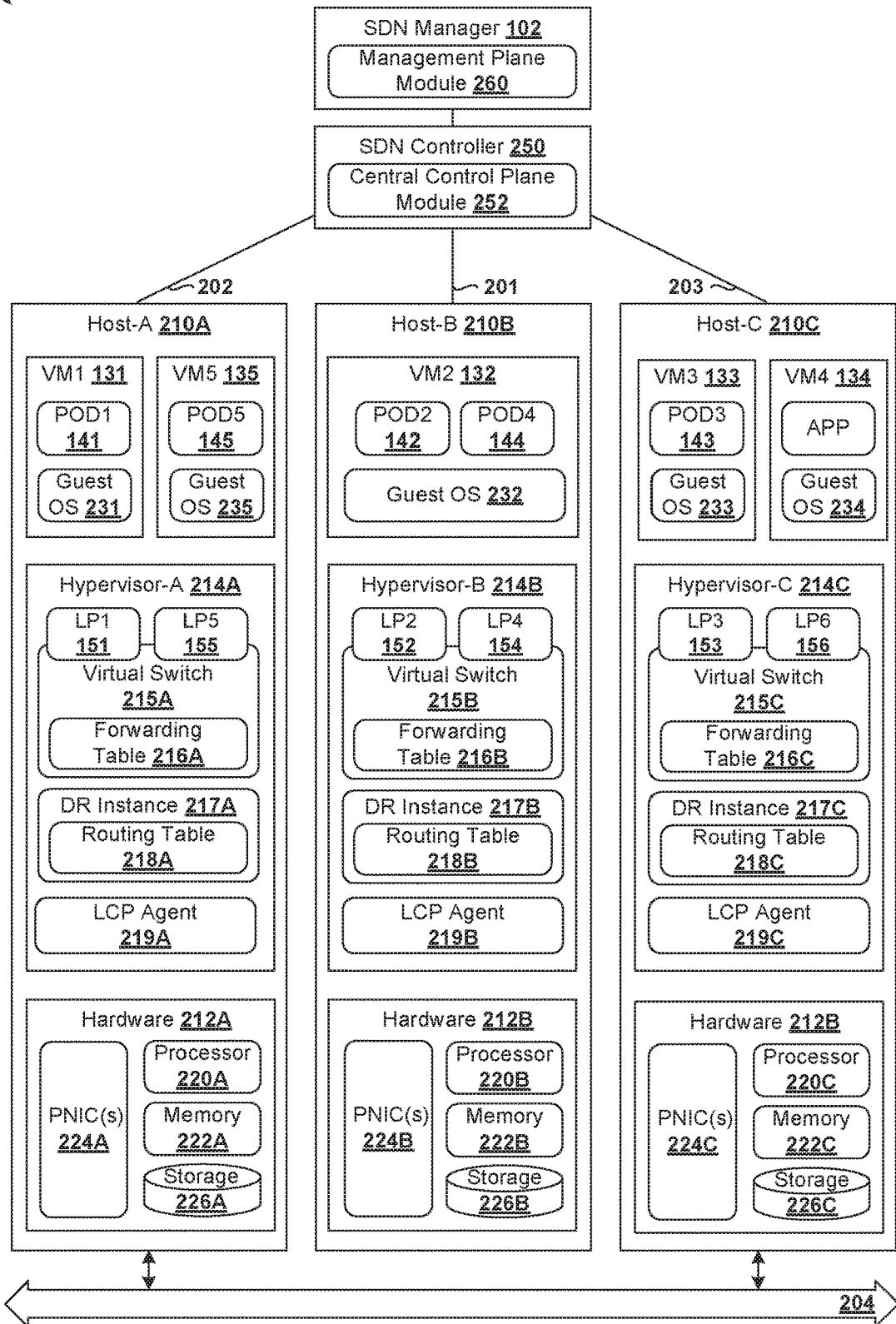
FIG. 2 is a schematic diagram illustrating an example physical implementation view of the SDN environment in FIG. 1.

FIG. 2 is a schematic diagram illustrating a physical implementation view 200 of SDN environment 100 in FIG. 1. Depending on the desired implementation, SDN environment 100 may include additional and/or alternative components than that shown in FIG. 2. For example, SDN environment 100 may include multiple physical hosts, such as host-A 210A, host-B 210B and host-C 210C that are interconnected via physical network 204. Note that SDN environment 100 may include any number of hosts (also known as a "host computers", "host devices", "physical servers", "server systems", "transport nodes," etc.), where each host may be supporting tens or hundreds of VMs.

Each host 210A/210B/210C may include suitable hardware 212A/212B/212C and virtualization software (e.g., hypervisor-A 214A, hypervisor-B 214B, hypervisor-C 214C) to support various VMs 131-135. For example, host-A 210A supports VM1 131 and VM5 135; host-B 210B supports VM2 132; and host-C 210C supports VM3 133 and VM4 134. Hypervisor 214A/214B/214C maintains a mapping between underlying hardware 212A/212B/212C and virtual resources allocated to respective VMs 131-135. Hardware 212A/212B/212C includes suitable physical components, such as central processing unit (CPU) or processor 220A/220B/220C; memory 222A/222B/222C; physical network interface controllers (NICs) 224A/224B/224C; and storage disk(s) 226A/226B/226C, etc.

Virtual resources are allocated to VMs 131-135 to support respective guest operating systems (OS) 231-235 and application(s). For example, container(s) in POD1 141 may run inside VM1 131, POD2 142 and POD4 144 inside VM2 132, POD3 142 inside VM3 133, and POD5 inside VM5 135. Note that not all VMs have to support containers in the example in FIG. 2, such as VM4 134 supporting non-containerized application(s). The virtual resources (not shown for simplicity) may include virtual CPU, guest physical memory, virtual disk, virtual network interface controller (VNIC), etc. In practice, one VM may be associated with multiple VNICs and hardware resources may be emulated using virtual machine monitors (VMMs).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 214A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" may refer generally to multiple packets. The term "layer-2" may refer generally to a link layer or Media Access Control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hosts 210A-C maintains data-plane connectivity with each other via physical network 204 to facilitate communication among VMs located on the same logical overlay network. Hypervisor 214A/214B/214C may implement a virtual tunnel endpoint (VTEP) to encapsulate and decapsulate packets with an outer header (also known as a tunnel header) identifying the relevant logical overlay network. For example, hypervisor-A 214A implements a first VTEP associated with (IP address=IP-A, MAC address=MAC-A). Hypervisor-B 214B implements a second VTEP with (IP-B, MAC-B), and hypervisor-C 214C a third VTEP with (IP-C, MAC-C). Encapsulated packets may be sent via a tunnel established between a pair of VTEPs over physical network 204, over which respective hosts are in layer-3 connectivity with one another.

Each host 210A/210B/210C may implement local control plane (LCP) agent 219A/219B/219C to interact with management entities, such as SDN manager 102 residing on a management plane and SDN controller 250 on a central control plane. For example, control-plane channel 201/202/203 may be established between SDN controller 250 and host 210A/210B/210C using TCP over Secure Sockets Layer (SSL), etc. Management entity 102/250 may be implemented using physical machine(s), virtual machine(s), a combination thereof, etc. One example of a SDN controller is the NSX controller component of VMware NSX® (available from VMware, Inc.), which is configurable using SDN manager 102 in the form of an NSX manager.

Hypervisor 214A/214B/214C implements virtual switch 215A/215B/215C and logical distributed router (DR) instance 217A/217B/217C to handle egress packets from, and ingress packets to, corresponding VMs 131-135. In SDN environment 100, logical switches and logical DRs may be implemented in a distributed manner and can span multiple hosts to connect VMs 131-135. For example, logical switches that provide logical layer-2 connectivity may be implemented collectively by virtual switches 215A-C and represented internally using forwarding tables 216A-C at respective virtual switches 215A-C. Forwarding tables 216A-C may each include entries that collectively implement the respective logical switches. Further, logical DRs that provide logical layer-3 connectivity may be implemented collectively by DR instances 217A-C and represented internally using routing tables 218A-C at respective DR instances 217A-C. Routing tables 218A-C may each include entries that collectively implement the respective logical DRs.

Figure 4:
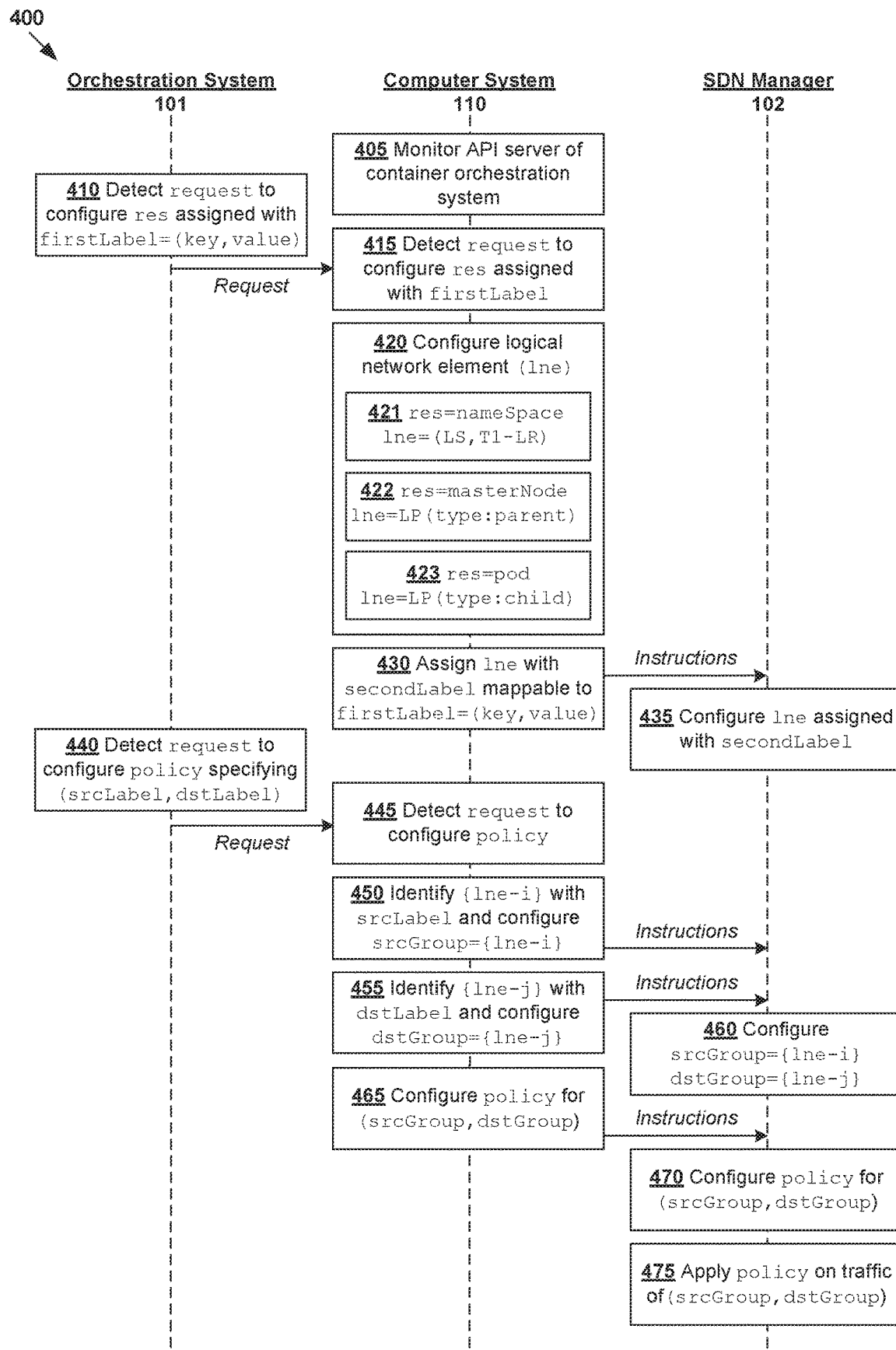
FIG. 4 is a flowchart of an example detailed process for a computer system to perform container-based network policy configuration in an SDN environment.

Packets may be received from, or sent to, a VM or a pod running inside the VM via a logical switch port, such as "LP1" to "LP6" 151-156 (to be discussed further using FIG. 4). Here, the term "logical port" or "logical switch port" may refer generally to a port on a logical switch to which a virtualized computing instance is connected. A "logical switch" may refer generally to a software-defined networking (SDN) construct that is collectively implemented by virtual switches 215A-C in the example in FIG. 1, whereas a "virtual switch" may refer generally to a software switch or software implementation of a physical switch. In practice, there is usually a one-to-one mapping between a logical port on a logical switch and a virtual port on virtual switch 215A/215B/215C. However, the mapping may change in some scenarios, such as when the logical port is mapped to a different virtual port on a different virtual switch after migration of the corresponding VM (e.g., when the source host and destination host do not have a distributed virtual switch spanning them).

Through virtualization of networking services in SDN environment 100, logical overlay networks may be provisioned, changed, stored, deleted and restored programmatically without having to reconfigure the underlying physical hardware architecture. A logical overlay network (also known as "logical network") may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts.

In one example in FIG. 1, VM1 131 and VM2 132 may be located on a first logical layer-2 segment and connected to a first logical switch (see "LS1" 161) and a first tier-1 logical router (see "T1-LR1" 171). In another example, VM3 133 may be located on a second logical layer-2 segment and connected to a second logical switch (see "LS2" 162) and a second tier-1 logical router (see "T1-LR2" 172). Using a two-tier topology, tier-1 logical routers 171-172 may be connected with each other or an external network (not shown) via a tier-0 logical router (see "T0-LR" 170). Logical network elements 171-172, 161-162 and 151-154 will be discussed further using FIG. 4.

As container technologies are more widely deployed, the risk of security breaches affecting containers may also increase. However, securing container-based clusters is generally a complex and challenging task. For example, a comprehensive set of security policies is required to account for isolation at the perimeter of a cluster as well as for east-west communication. The implementation of such policies relies on accurate policy configuration and enforcement at different container-based resources and logical network elements of the underlying SDN infrastructure. Further, the presence of a multitude of network policies, which may be heterogenous, often complicates the management and inspection of network connectivity among container-based resources and logical network elements. In some cases, a malicious third party might exploit security loopholes to gain access to an organization's container-based clusters to run malicious tasks.

Container-Based Network Policy Configuration

According to examples of the present disclosure, container-based network policies may be configured in an improved manner. Examples of the present disclosure may be implemented as part of a single universal point for configuring and managing container-based network policies in SDN environment 100. As used herein, the term "container-based network policy" may refer generally to a set of rule or rules that define how a container-based resource may interact (e.g., communicate) with another container-based resource, such as between a node and a pod, among multiple nodes or pods, etc. In the following, container-based network policies will be exemplified using security policies (e.g., firewall rules) to manage network connectivity among container-based resources. It should be understood that other container-based network policies (e.g., IPtables rules or filters) may be configured according to examples of the present disclosure.

Figure 3:
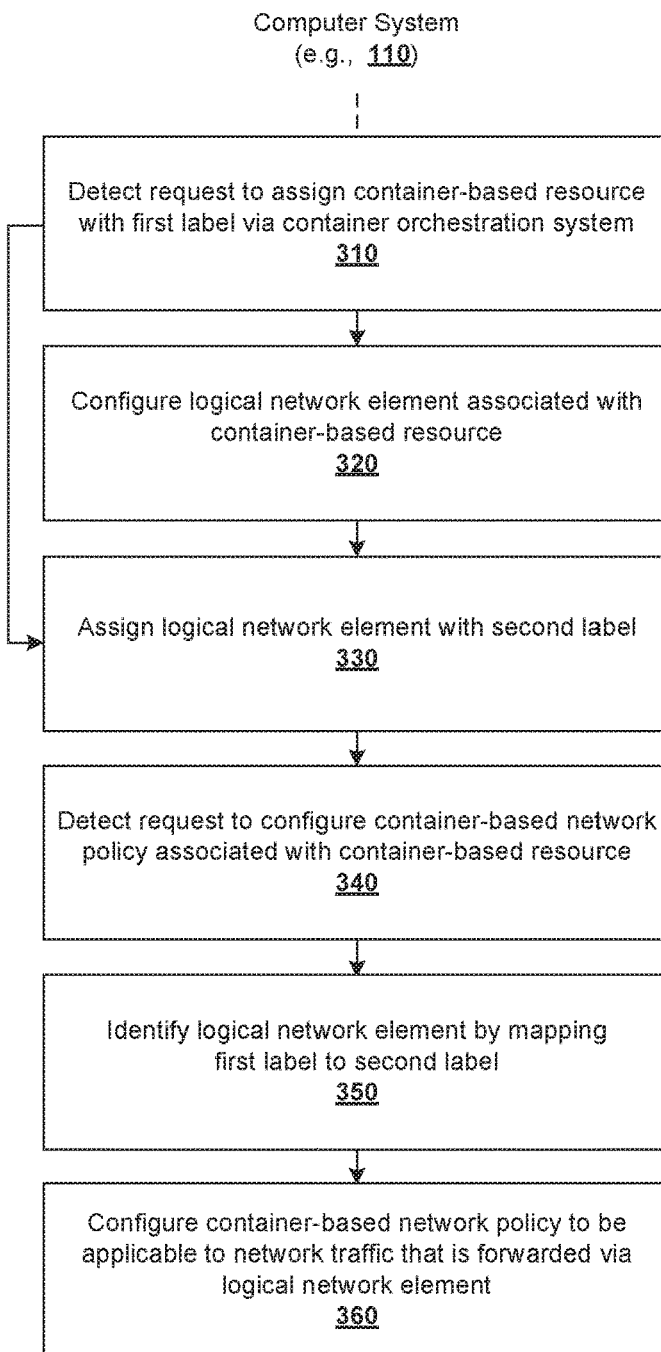
FIG. 3 is a flowchart of an example process for a computer system to perform container-based network policy configuration in an SDN environment.

In more detail, FIG. 3 is a flowchart of example process 300 for computer system 110 to perform container-based network policy configuration in SDN environment 100. Example process 300 may include one or more operations, functions, or actions illustrated by one or more blocks, such as 310 to 360. The various blocks may be combined into fewer blocks, divided into additional blocks, and/or eliminated depending on the desired implementation. Example process 300 may be implemented using any suitable "computer system," such as hardware and/or software capable of acting as container plugin 110, etc. In the following, the term "configure" at block 310 and 340 may refer generally to creating a new entity (i.e., container-based resource or logical network element), modifying or updating an existing entity, etc.

At 310 in FIG. 3, container plugin 110 may detect a first request (see 181 in FIG. 1) to assign a container-based resource with a first label via container orchestration system 101. In the example in FIG. 1, container-based resource=master node 121 in cluster 120 may be associated with logical network element=logical switch port LP1 151. Depending on the desired implementation, the request at block 310 may be detected when master node 121 is created, or at a later time. In the former case, container plugin 110 may also configure logical network element=LP1 151 at block 320.

At 330 in FIG. 3, container plugin 110 may assign LP1 151 with a second label=A2 (see 184) that is mappable to a first label=A1 (see 183) assigned to master node 121 via SDN manager 102 (see 182). Depending on the desired implementation, first label=A1 may specify a key-value pair, such as node type=master associated with master node 121. In this case, second label=A2 assigned to LP1 151 may also specify the same key-value pair. In other words, first label=A1 and second label=A2 may belong to the same label namespace such that network policies configured for master node 121 will be applicable to associated LP1 151. In practice, a label may also be referred to as tag, metadata, or the like.

At 340 and 350 in FIG. 3, in response to detecting a second request (see 191) to configure a container-based network policy associated with container-based resource=master node 121, container plugin 110 may identify logical network element=LP1 151 by mapping first label=A1 assigned to master node 121 to second label=A2 assigned to LP1 151. At 360, container plugin 110 may configure the container-based network policy to be applicable to network traffic that is forwarded via LP1 151 associated with master node 121.

Using examples of the present disclosure, network administrators may configure container-based network policies via container orchestration system 101 to automatically cause those policies to be implemented by corresponding logical network elements in an efficient manner. This approach should be contrasted against conventional approaches that necessitate network administrators to create network policies via container orchestration system 101, and manually configure firewall rules for VM(s) and/or pod(s) via SDN manager 102.

Figure 5:
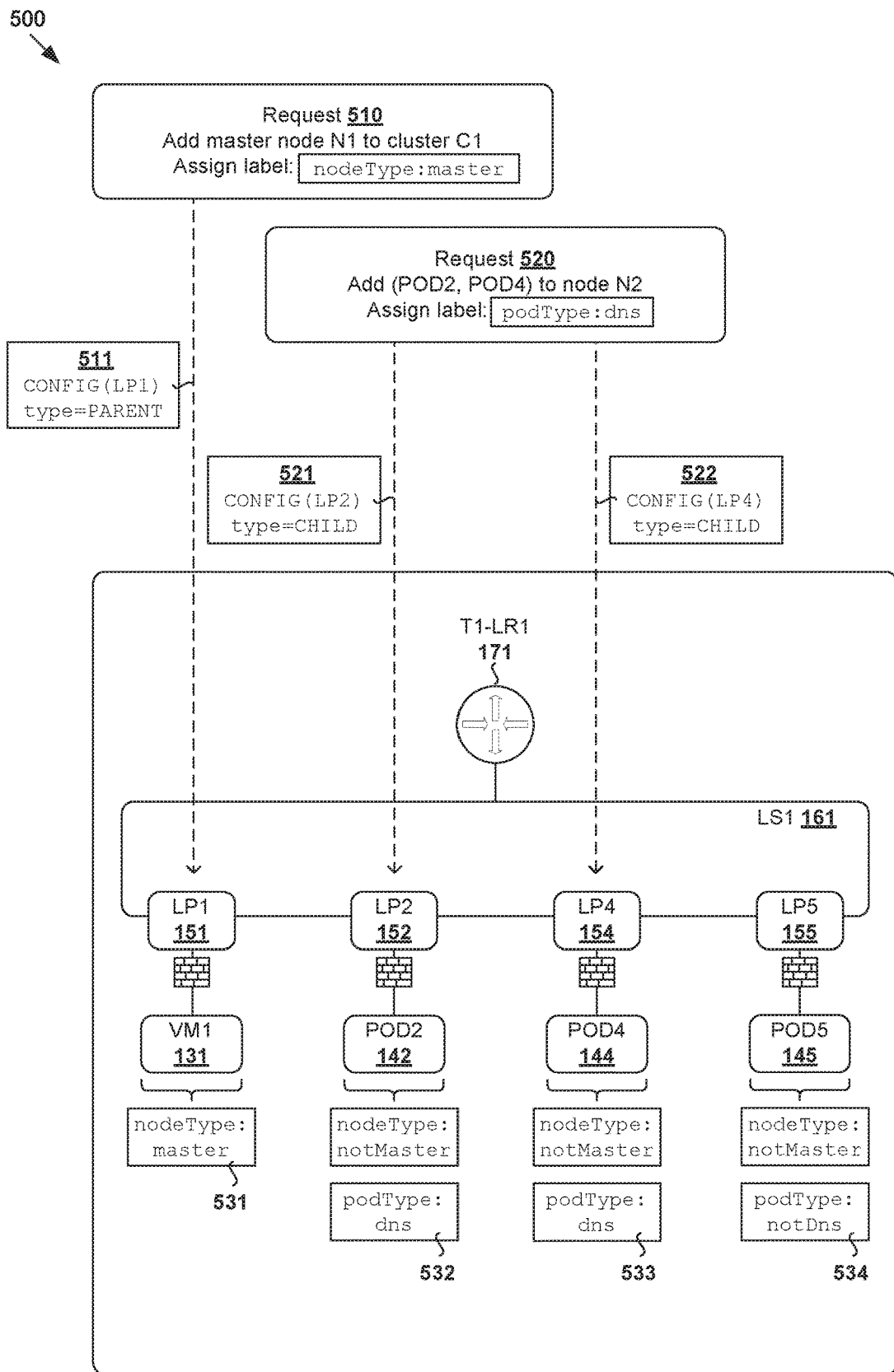
FIG. 5 is a schematic diagram illustrating an example configuration of container-based resources and logical network elements in an SDN environment.

As will be discussed further using FIGS. 4-6, examples of the present disclosure may be implemented to reduce the likelihood of security breaches in SDN environment 100. For example, a container-based network policy in the form of a security policy (e.g., firewall rule) may be configured to allow network traffic from source=pod 141/142 and destination=master node 121. Traffic from other source(s) to master node 121 may be blocked. Security policies may also be configured to allow or block network traffic between a pair of nodes, a pair of pods, a node and a pod, etc.

Label Assignment

FIG. 4 is a flowchart of example detailed process 400 for a computer system to perform container-based network policy configuration in SDN environment 100. Example process 400 may include one or more operations, functions, or actions illustrated by one or more blocks, such as 405 to 475. The various blocks may be combined into fewer blocks, divided into additional blocks, and/or eliminated depending on the desired implementation.

At 405 in FIG. 4, container plugin 110 may monitor events on container orchestration system 101, including configuration container-based resources and container-based network policies. Using Kubernetes as an example, container plugin 110 may monitor an API server supported by container orchestration system 101 for any CREATE, READ, UPDATE and REMOVE events. For example, when a user creates or modifies a container-based resource, a corresponding CREATE or UPDATE event may be detected by container plugin 110.

At 410, 415 and 420 in FIG. 4, in response to detecting a request to configure a container-based resource (denoted as "res") via container orchestration system 101, container plugin 110 may configure a logical network element (denoted as "lne") by generating and sending instructions to SDN manager 102. Further, at 430 and 435, based on a first label assigned to the container-based resource, container plugin 110 may assign a second label to the logical network element via SDN manager 102.

A user-configurable label may be used to "mark" or "tag" container-based resource, such as pods and nodes for management purposes. In practice, a label in the form of key-value pair may be attached at any suitable time (e.g., creation or post-creation) and subsequently modified. For example, a label may be a Kubernetes® label, Docker® label, etc. Each container-based resource may be associated with a set of multiple labels denoted as labels={label_i}, where label_i=(key_i, value_i) and i=1, . . . , N. To select an object assigned with a particular label_i, a selector may be defined in the form of selector=(key_i, value_i).

Some example configurations will be explained using FIG. 5, which is a schematic diagram illustrating example configuration 500 of container-based network resources and logical network elements in SDN environment 100.

(a) At 421 in FIG. 4, a container-based resource=namespace (NS1) may be configured for cluster 120 via container orchestration system 101. In response, container plugin 110 may cause SDN manager 102 to configure a network topology for the namespace. This may involve configuring tier-1 logical router=T1-LR1 171 and attaching T1-LR1 171 to a tier-0 logical router=T0-LR 170. Further, a logical router port may be created on T1-LR1 171 and attached to logical switch=LS1 161. This way, a multi-tier topology may be used to isolate multiple namespaces configured for cluster 120. Tier-1 (T1) is referred as the lower tier, and tier-0 (T0) the upper tier. Each namespace (e.g., ns1) may have its own objects described using a unique path (e.g., /api/v1/namespaces/ns1).

In practice, logical switch 161-162 in FIG. 1 may be implemented collectively by multiple hosts 210A-C, such as using virtual switches 215A-C and represented internally using forwarding tables 216A-C. Tier-1 logical routers 171-172 may be implemented collectively using DR instances 217A-C and represented internally using routing tables 218A-C at respective hosts 210A-C. Tier-1 logical routers 171-172 and tier-0 logical router 170 may be implemented using an edge appliance that provides centralized stateful services to VMs 131-135 and pods 141-145, such as IP address assignment using dynamic host configuration protocol (DHCP), load balancing, network address translation (NAT), etc. Tier-0 logical router 170 may be deployed at the edge of a data center to facilitate north-south traffic to an external network.

(b) At 422 in FIG. 4, in response to detecting a first request (see 510) to configure container-based resource=master node 121 for cluster 120, logical network element=LP1 151 may be configured. In this case, master node 121 may be implemented using VM1 131, and LP1 151 is a logical switch port of type=parent (see 511). Through container orchestration system 101, master node 121 is assigned with a first label specifying key-value pair "nodeType: master" to indicate that its node type. In this case, second label specifying the same key-value pair may be assigned to LP1 151 (see 531) via SDN manager 102.

(c) At 423 in FIG. 4, in response to detecting a second request (see 520) to add (POD2 142, POD4 144) to cluster 120, logical switch ports (LP2 152, LP4 154) may be configured (see 521, 522). Through container orchestration system 101, POD2 142 and POD4 144 may be assigned with a first label="podType: dns" in request 520 to indicate that they are domain name system (DNS) servers. In this case, a second label specifying the same key-value pair may be assigned to LP2 152 (see 532) and LP4 154 (see 533) via SDN manager 102. This way, a logical set that includes (POD2 142, POD4 144) may be grouped and selected using second label="podType: dns."

Similarly, LP5 155 may be configured for POD5 145 and assigned with label="podType:notDns" in a similar manner (see 534). Logical switch ports LP2 152, LP4 154 and LP5 155 may be logical switch ports of type=child because of their association with respective POD2 142, POD4 144 and POD5 145. Using Kubernetes as an example, master node 121 implemented by VM1 131 is responsible for management-plane and control-plane tasks associated with cluster 120. Both master node 120 and worker nodes 121-123 are responsible for running their own containerized applications. Master node 120 may implement an API server, a scheduler, a controller manager and a dashboard via which users may perform container configuration.

Referring also to FIG. 2, both POD2 142 and POD4 144 may be executed inside VM2 132, which is assigned with label="nodeType: notMaster" because it implements worker node 122. POD5 145 may be executed inside VM5 135, which also implements a worker node. Within a particular pod, multiple containers may share a kernel namespace for networking and storage volume. Multiple containers may be grouped into a pod for any suitable reasons. For example, both a first container running a web server and a second container running a logging script for that web server may be placed into POD5 145. This way, both the web server and its logging script may share the same storage volume to write, read, process and export logs. Containers within a pod may communicate using inter-process communications (IPC).

Example Container-Based Network Policy Configuration

According to examples of the present disclosure, container-based network policies may be configured for container-based resources and associated logical network elements based on labels in the same label namespace. Examples of the present disclosure may be implemented as part of a security framework for one-stop security policy solution for cloud-native applications. This way, the configurability of network policies and security defense for container-based resources may be improved in SDN environment 100. In the following, blocks 440-475 will be explained using FIG. 6, which is a schematic diagram illustrating first example 600 of container-based network policy configuration in SDN environment 100.

Conventionally, Kubernetes policy solutions have a significant limitation in that only a group of pods may be selected to apply a particular network policy, while the underlying infrastructure (e.g., VM) and network (e.g., logical routers, logical switches and logical ports) are left unconsidered. Consequently, users have to resort to separate, additional solutions for isolation. For example, in a cloud-native landscape, VM is no longer a first-class citizen from a networking perspective, in that network plugins for Kubernetes are not required to manage VM networks, and most plugins do not. Consequently, coupled with the network policy limitation mentioned above, users may need to resort to setting up IP table rules on individual VMs, and firewall rules on their cloud providers to implement VM-to-VM and VM-to-pod traffic isolation. This results in management of network policies that is dispersed and ad hoc, which is inefficient and undesirable.

At 405, 440 and 445 in FIG. 4, container plugin 110 may monitor container orchestration system 101 for events and detect a request to configure a container-based network policy for one container-based resource or a group of multiple container-based resources. The request may be initiated by a user (e.g., IT and/or cluster administrator) responsible for creating and maintaining Kubernetes clusters and underlying SDN infrastructure. In practice, the network policy may be defined to secure and isolate container-based resources (e.g., nodes and pods). The network policy may be configured to establish the contour of a tenant's networking capabilities, and at the same time reduce the surface exposed to security vulnerabilities.

Figure 6:
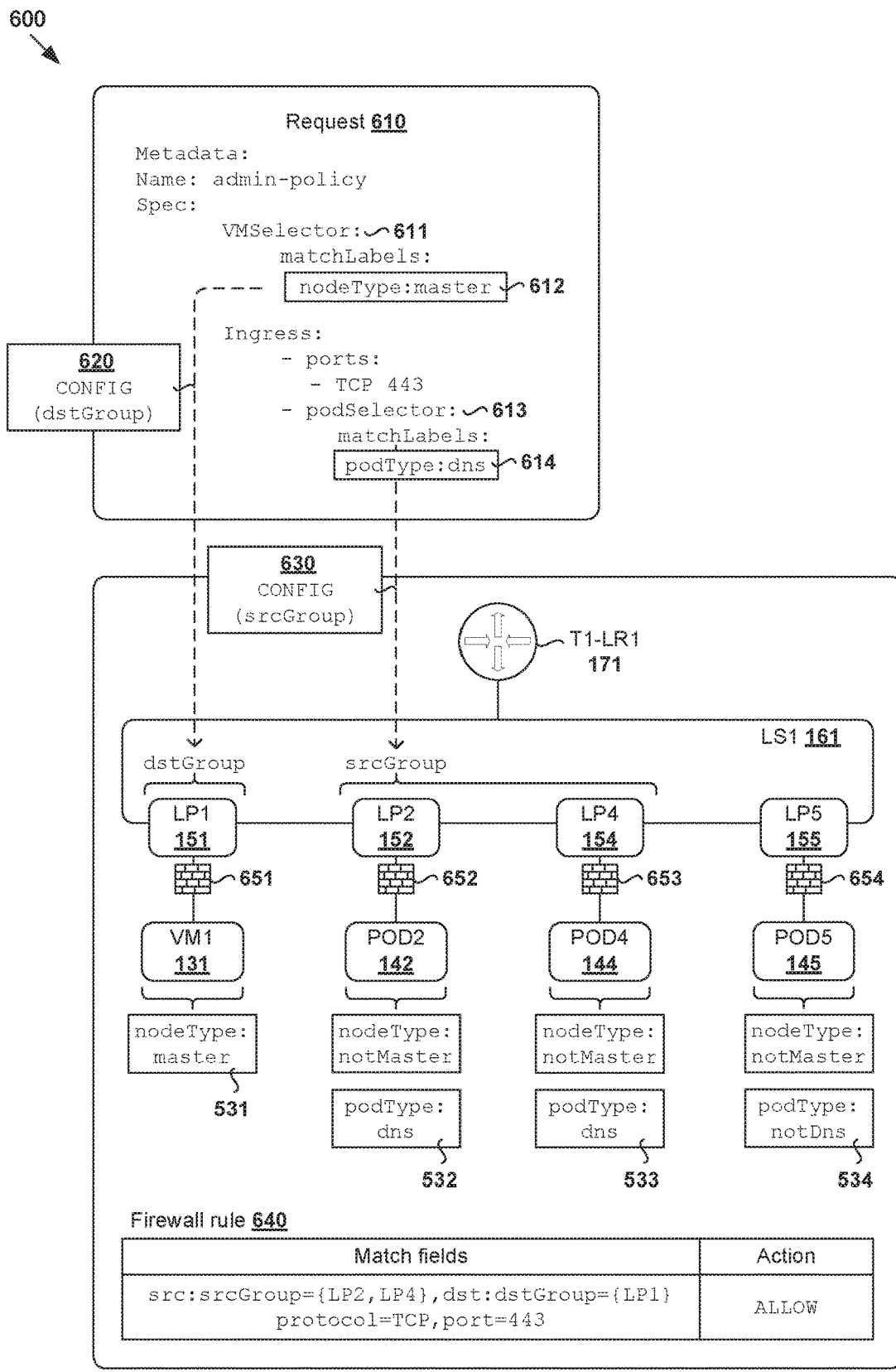
FIG. 6 is a schematic diagram illustrating an example of container-based network policy configuration in an SDN environment.

Referring also to FIG. 6, a network policy may be specified in request 610 using custom resource definition (CRD). Request 610 may specify selector(s) to select container-based resource(s) to which the network policy is appliable. At 611-612, for example, request 610 includes a VM selector to select node(s) implemented using VM(s), such as node(s) with label="nodeType: master." At 613-614, request 610 includes a pod selector to select pod with label="podType: dns." Any additional and/or alternative selector(s) may be used, such as namespace selector to select namespace(s). Each selector may specify the exact label to be matched, a prefix or "contains" string matching with names. For example, a VM selector specifying "contains: worker" may be matched to label that includes the string "worker."

Request 610 may include other policy-related information, such as packet header fields (e.g., protocol=TCP and port number=443) to which the firewall rule is applicable, priority level (e.g., top or bottom), classless inter-domain routing (CIDR) information (e.g., 10.10.10.0/24). In the example in FIG. 6, the network policy may be used to define whitelist rules to allow traffic matching a set of match fields. This way, all ingress and/or egress traffic will be dropped unless allowed by the network policy. In practice, the network policy may also be used to define blacklist rules to block traffic matching a set of match fields.

At 450, 455 and 460 in FIG. 4, in response to detecting request 610, container plugin 110 may identify logical network element(s) associated with the selected container-based resource(s). In the example in FIG. 6, request 610 specifies a firewall rule that is applicable to TCP traffic with port number 443 from a source pod to a destination VM. At 620 in FIG. 6, container plugin 110 may identify destination=VM1 131 based on label="nodeType: master" and configure a destination logical port group that includes LP1 151. At 630, container plugin 110 may identify source= (POD2 142, POD4 144) based on label="podType: dns" and configure a source logical port group that includes (LP2 152, LP4 154). The configuration at blocks 450-455 may involve container plugin 110 generating and sending instructions to SDN manager 102.

At 465 and 470 in FIG. 4, container plugin 110 may generate and send instructions to SDN manager 102 to configure the network policy. At 475, the network policy may be applied using hosts 110A-C to allow or block traffic to LP1 151 connected to VM1 131. In the example in FIG. 6, firewall rule 640 specifies action=ALLOW to allow packets from any member of source group=(LP2 152, LP4 154) to destination group=(LP1 151) for protocol=TCP and port number=443.

Depending on the desired implementation, firewall rule 640 may be applied using a distributed firewall (DFW) engine to filter traffic being forwarded via a logical port. For example, firewall rule 640 may be applied at a first DFW engine 651 to filter ingress (i.e., incoming) traffic at LP1 151 associated with VM1 131. Additionally or alternatively, firewall rule 640 may be applied at a second DFW engine 652 to filter egress (i.e., outgoing) traffic at LP2 152 connected to POD2 142, as well as a third DFW engine 653 to filter egress traffic at LP4 154. Firewall rule 640 may also be applied at DFW engine 654 to block egress traffic from source=LP5 155 to destination=LP1 151 because associated POD5 145 is not tagged with "podType: dns" (see 534).

Using examples of the present disclosure, container-based network policies may be namespaced to facilitate the mapping between (a) container-based resource(s) managed by container orchestration system 101 and (b) logical network element(s) managed by SDN manager 102. In response to detecting a CREATE event with policy specification, container plugin 110 computes the required firewall rules to be created and finds which firewall section to place the firewall rules. To configure the firewall rules, container plugin 110 may invoke an API supported by SDN manager 102. Leveraging the realization state information reported by SDN manager 102, container plugin 110 may publish the state information once it becomes available. This way, the user may be informed of the success or failure in realizing the firewall rules in the datapath via container orchestration system 101. The framework may be configured to offer users the capability to define comprehensive security policies that are applicable to various components of infrastructure (e.g., VMs and pods), network topology formed by various logical network elements (e.g., logical ports, logical switches and logical routers), and container-based resources (e.g., clusters, nodes and namespaces).

Using examples of the present disclosure, the risk of hindering network debuggability as a result of lack of centralized management of various security policies may be reduced. Users may plug and play different technologies, such as Kubernetes network policy for layer-3 and layer-4 isolation for pods, and Cilium for layer 7 and cloud provider's firewall for infrastructure level isolation. Cilium is an open-source software for securing network connectivity between application services. Where possible, legacy firewall rules may be automatically converted to network policies that support automatic mapping from container-based resource(s) to logical network element(s) for the purpose of centralized management.

Container-Based Connectivity Checks

In practice, various network issues that affect the performance of logical network elements and corresponding container-based resources may occur in SDN environment 100.

Conventionally, however, it may be challenging to perform network diagnosis using existing tools. In some cases, users may need to exhaust all tracing or monitoring tools to pinpoint the cause of network issues, such as packet drop, etc. For example, ping and traceroute are Linux utilities for testing network connectivity for debugging purposes. Due to the scale and complexity of the underlying logical network topology, such utilities are often inadequate for troubleshooting and debugging purposes. This may in turn increase system downtime in SDN environment 100 due to undiagnosed performance issues.

According to examples of the present disclosure, network troubleshooting and diagnosis may be improved by performing connectivity checks between a pair of container-based resources and corresponding logical network elements. In practice, a container-based network connectivity check tool may be built upon the container-based network policy configuration explained using FIG. 1 to FIG. 6. Using Kubernetes as an example, container-based network connectivity checks may be used for inspecting Kubernetes security policies that interact with packets during end-to-end transfers. In this case, examples of the present disclosure may be implemented to identify active security policies that may result in packet drops affecting network flows.

Figure 7:
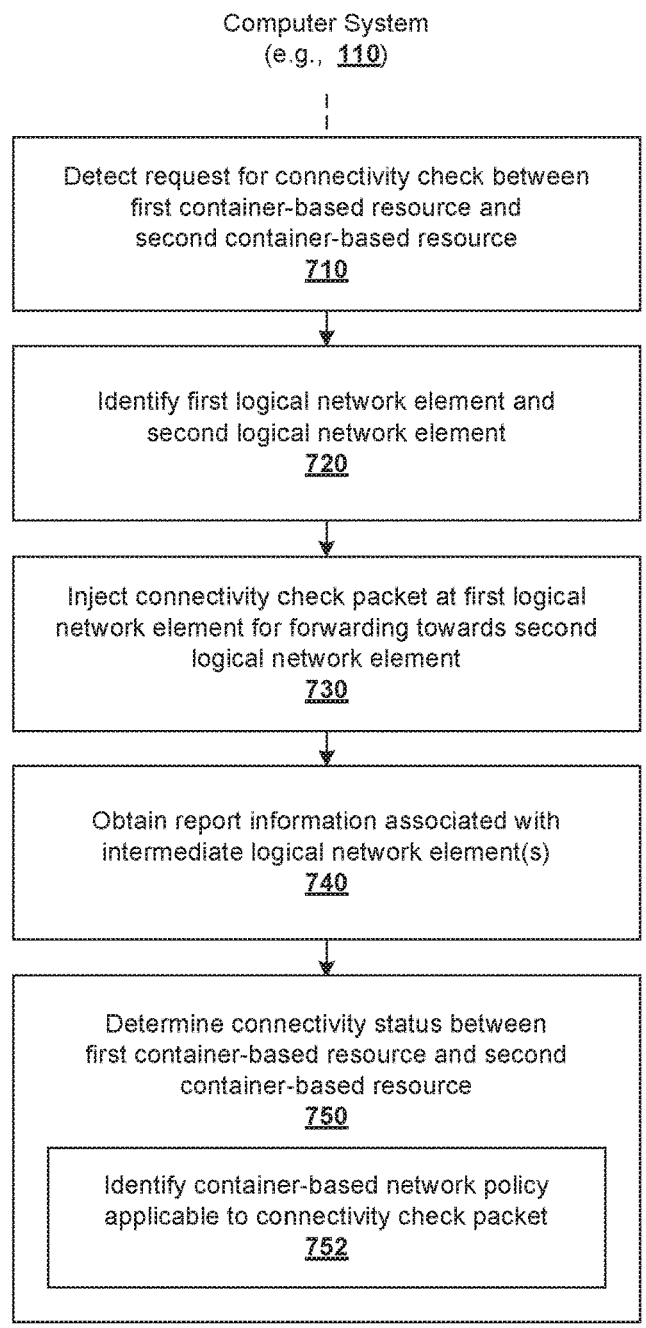
FIG. 7 is a flowchart of an example process for a computer system to perform container-based connectivity check in an SDN environment.

In more detail, FIG. 7 is a flowchart of example process 700 for computer system 110 to perform container-based network policy configuration in SDN environment 100. Example process 700 may include one or more operations, functions, or actions illustrated by one or more blocks, such as 710 to 752. The various blocks may be combined into fewer blocks, divided into additional blocks, and/or eliminated depending on the desired implementation. Example process 700 may be implemented using any suitable "computer system," such as hardware and/or software capable of acting as container plugin 110, etc.

At 710 in FIG. 7, container plugin 110 may detect, from container orchestration system 101, a request for a connectivity check between a first container-based resource (e.g., POD4 144) and a second container-based resource (e.g., POD3 143). At 720, a first logical network element (e.g., LP4 154) associated with the first container-based resource and a second logical network element (e.g., LP3 153) associated with the second first container-based resource may be identified. At 730 in FIG. 7, a connectivity check packet may be injected at the first logical network element to cause the connectivity check packet to be forwarded towards the second logical network element.

At 740 in FIG. 7, container plugin 110 may receive report information associated with intermediate logical network element(s) that are located along a path between the first logical network element (e.g., LP4 154) and the second logical network element (e.g., LP3 153). At 750, based on the report information, a connectivity status associated with the first container-based resource (e.g., POD4 144) and the second container-based resource (e.g., POD3 143) may be determined.

Depending on the desired implementation, block 750 may include identifying a container-based network policy that is applicable to the connectivity check packet (see 752). For example, the container-based network policy may be identified based on labels assigned to respective container-based resources (e.g., POD3 143 and POD4 144 and) and/or logical network elements (e.g., LP3 153 and LP4 154). As will be described below, the container-based network policy may be a firewall rule that is configured to allow or block communication between the container-based resources.

Although exemplified using pods, it should be understood that container-based connectivity checks may be performed for the following pairs of container-based resources: node and pod, pair of nodes, pod and service, pod and ingress, etc. The pair of container-based resources for which a connectivity check is initiated may belong to the same namespace or different namespaces. Depending on the desired implementation, the pair of container-based resources may belong to the same cluster or different clusters. In the following, some examples will be discussed using FIG. 4, FIG. 8, FIG. 9 and FIG. 10.

(a) Network Policy Configuration

According to blocks 405-435 in FIG. 4, container plugin 110 may configure and label associated logical network elements by generating and sending instructions (e.g., API calls) to SDN manager 102. Various example requests are shown at 810 in FIG. 8, which is a schematic diagram illustrating example 800 of network policy configuration prior to a container-based connectivity check in SDN environment 100.

Figure 8:
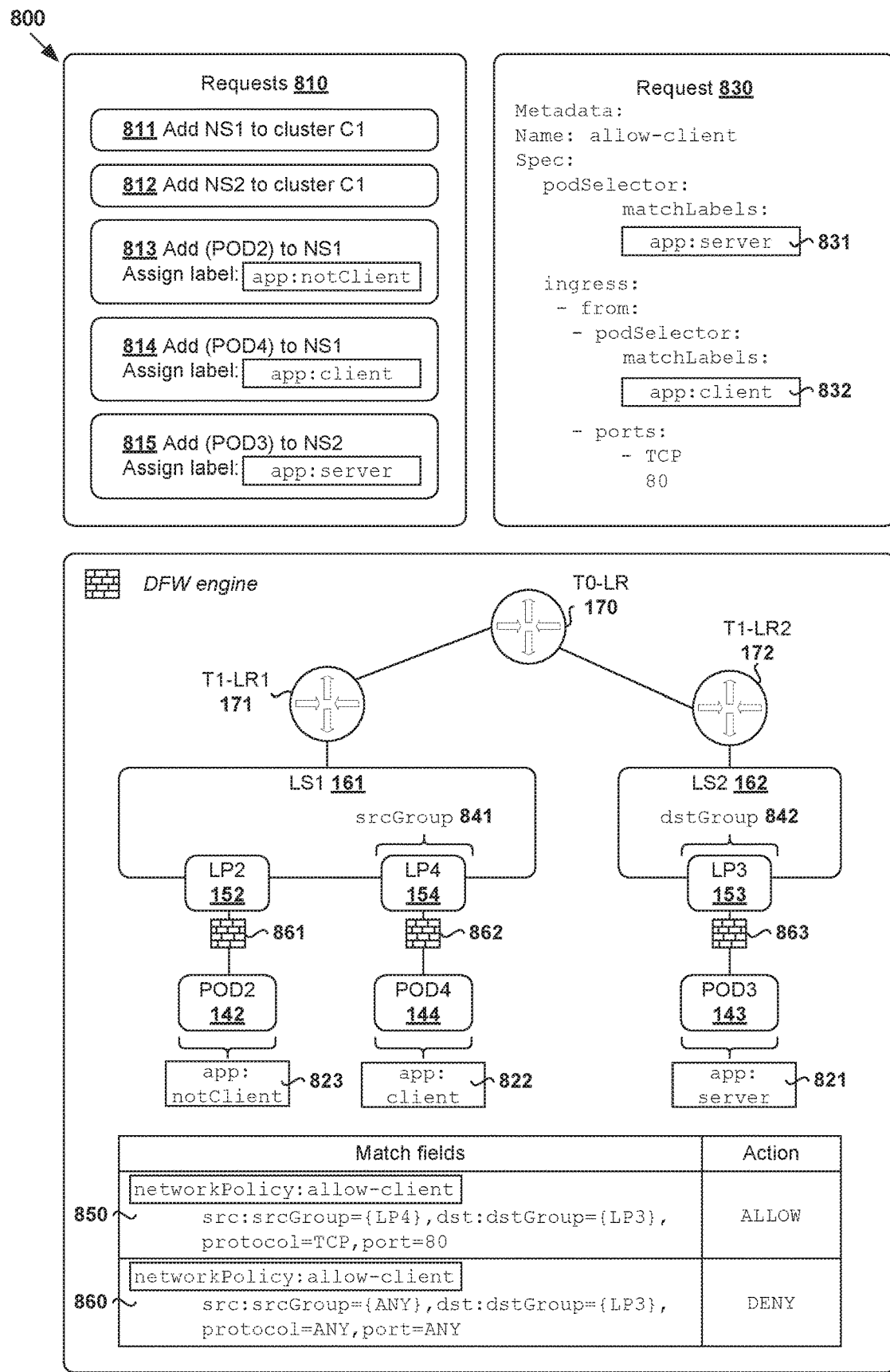
FIG. 8 is a schematic diagram illustrating an example of container-based network policy configuration prior to a container-based connectivity check in an SDN environment.

At 811 in FIG. 8, based on a first request to add namespace=NS1 to cluster 120, container plugin 110 may configure T1-LR1 171 and logical switch LS1 161. At 812, based on a second request to configure namespace=NS2, container plugin 110 may configure another T1-LR2 172 and LS2 162. At 813, based on a third request to add POD2 142 and POD4 144 to namespace=NS1, respective LP2 152 and LP4 154 may be configured on LS1 161. At 814, based on a fourth request to add POD3 143 to namespace=NS2, LP3 153 may be configured on LS2 162 and connected to POD3 143 supported by VM3 133.

In the example in FIG. 8, POD3 143 may implement a web server and tagged with label="app: server" (see 815). POD4 144 may implement a client server and tagged with label="app: client" (see 814). In contrast, POD2 142 may be tagged with label="app: notClient" (see 813) to indicate it is not a client server. As such, LP3 153 may be assigned with label="app: server" (see 821), LP4 154 with label="app: client" (see 822) and LP2 152 with label="app: notClient" (see 823).

According to blocks 440-475, container plugin 110 may configure a container-based network policy for container-based resource(s) and associated logical network elements via SDN manager 102. For example in FIG. 8, consider a request (see 830) to configure a network policy (name="allow-client") to allow traffic to pods tagged with label="app: server" (see 831) only from pods tagged with label="app: client" (see 832). At 841, a destination group=LP3 153 may be created to collect logical port(s) tagged with "app: server." At 842, a source group=LP4 154 may be created to collect logical port(s) tagged with "app: client."

Firewall rule 850 may be created to allow TCP 80 traffic from the source group (i.e., LP4 154 connected to POD4 144) to the destination group (i.e., LP3 153 connected to POD3 143). This way, traffic from any source that does not belong to the source group will be blocked, such as from LP2 152 tagged with "app: notClient" to LP3 153. Firewall rule 850 may be applied to ingress traffic received at destination LP3 153 using DFW engine 863. Additionally or alternatively, firewall rule may be applied to egress traffic forwarded via LP4 154 using DFW engine 862 and/or LP2 152 using DFW engine 861. In practice, DFW engines may be implemented using hypervisors 114A-C of respective hosts 110A-C.

(b) Connectivity Check for POD3 and POD4

Figure 9:
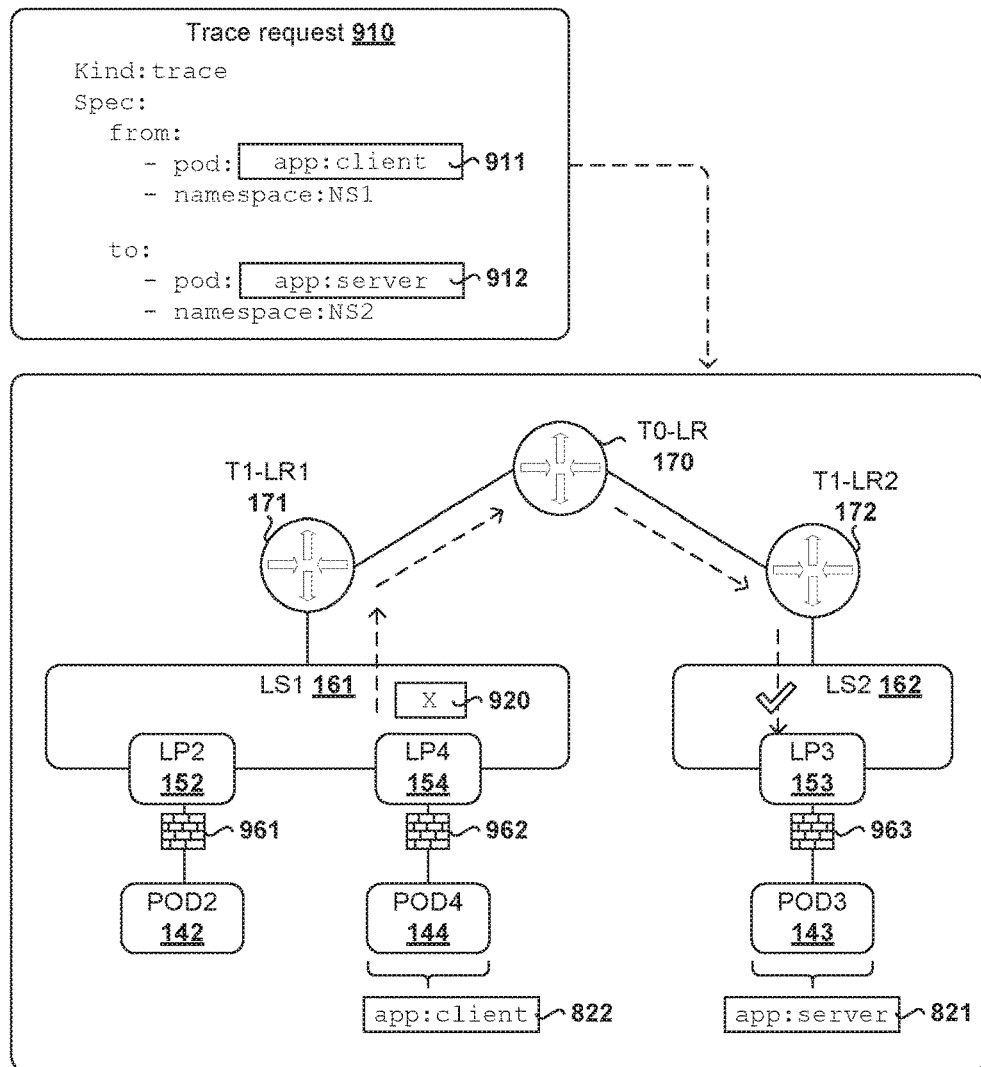
FIG. 9 is a schematic diagram illustrating a first example of container-based connectivity check in an SDN environment.

FIG. 9 which is a schematic diagram illustrating first example 900 of container-based connectivity check in SDN environment 100. In practice, container plugin 110 may monitor events on container orchestration system 101 periodically, particularly a user's request for container-based connectivity checks.

At 910 in FIG. 9, container plugin 110 may detect a first trace request to initiate a first connectivity check between POD4 144 and POD3 143. Trace request 910 may be a specification with the required information for a network flow to be analyzed. For example, source=POD4 144 in namespace=NS1 may be selected using a pod selector identifying label="app: client" (see 911). Destination=POD3 143 in namespace=NS2 may be selected using a pod selector identifying label="app: server" (see 912).

In response to detecting trace request 910, container plugin 110 may select source=LP4 154 based on label="app: client" (see 822) assigned to LP4 154 in the example in FIG. 8. Similarly, destination=LP3 153 may be selected based on label="app: server" (see 821) assigned to LP3 153. Container plugin 110 may also translate trace request 910 to tuple information (e.g., source IP address, source port number, destination IP address, destination port number and protocol) to be specified by the connectivity check packet (labelled "X").

At 920 in FIG. 9, the connectivity check packet may be injected at LP4 154 for forwarding towards LP3 153 via a datapath that includes LS1 161, T1-LR1 171, T0-LR 170, T1-LR2 172 and LS2 162 ("intermediate logical network elements"). In practice, any suitable approach may be used to generate and inject connectivity check packets. For example, a tool called Traceflow (available from VMware, Inc.) may be extended to inject a connectivity check packet (e.g., Traceflow packet) for cross-cloud connectivity checks. To perform a connectivity check between LP4 154 and LP3 153, connectivity check packet 920 may be injected by SDN manager 102 at host-B 210B for transmission to host-C 210C. Connectivity check packet 920 may include an inner packet that is encapsulated with an outer header. The inner packet may be addressed from POD4 144 (e.g., source IP-POD4) to POD3 143 (e.g., destination IP-POD3). The outer header may of the connectivity check packet may include address information of source host-B 210B (e.g., VTEP IP-B) and destination host-C 210C (e.g., VTEP IP-C).

Connectivity check packet 920 may traverse the logical network topology, potentially vising multiple transport nodes. Connectivity check packet 920 may be configured to cause intermediate logical network element to generate and send report information to SDN manager 102 and/or container plugin 110. Next, container plugin 110 may obtain report information from the intermediate logical network elements, either directly or indirectly via SDN manager 102. For example, container plugin 110 may interact with SDN manager 102 using hypertext transfer protocol (HTTP) requests, such as PUT and GET to obtain the necessary information. The report information may specify (ID, STATUS) at a particular logical network element. The ID may include any suitable information identifying its sender, such as a unique ID, name, element type, element sub-type, whether the sender is a tier-0 or tier-1 logical router (where applicable), any combination thereof. The ID may also indicate. The "STATUS" may be "RECEIVED," "FORWARDED," "DELIVERED," "DROPPED," etc.

At 930 in FIG. 9, the report information may specify the following status information: "INJECTED" at LP4 154 (see 931), "RECEIVED+FORWARDED" by LS1 (see 932), T1-LR1 171 (see 933), T0-LR 170 (see 934), T1-LR2 172 (see 935) and LS2 162 (see 936). The report information also indicates that the connectivity check packet is DELIVERED (see 937) to destination LP3 153. In this case, container plugin 110 may determine that LP4 154 has connectivity with LP3 153.

At 940 in FIG. 9, container plugin 110 may generate a trace result that identifies a network policy that is applicable to connectivity check packet 920 from LP4 154 to LP3 153. In this case, container plugin 110 may identify the network policy ("allow-client") configured in the example in FIG. 8 based on label (or tag or metadata) associated with the firewall rule traversed, such as "networkPolicy: allow-client" assigned to firewall rule 850.

Trace result 940 may specify a list of container-based resources traversed by the connectivity check packet, i.e., source POD4 144 in namespace=NS1, network policy="allow-client" that configured for NS1 and destination POD3 143 in namespace=NS2. Trace result 940 may also specify a list of logical network elements traversed by the connectivity check packet, i.e., LP4 154, LS1 161, T1-LR1 171, T0-LR 170, T1-LR2 172, LS2 162 and LP3 153. This way, container-based network policies interacting with end-to-end packet flows may be examined to identify any network connectivity issues.

(c) Connectivity Check for POD2 and POD3

Figure 10:
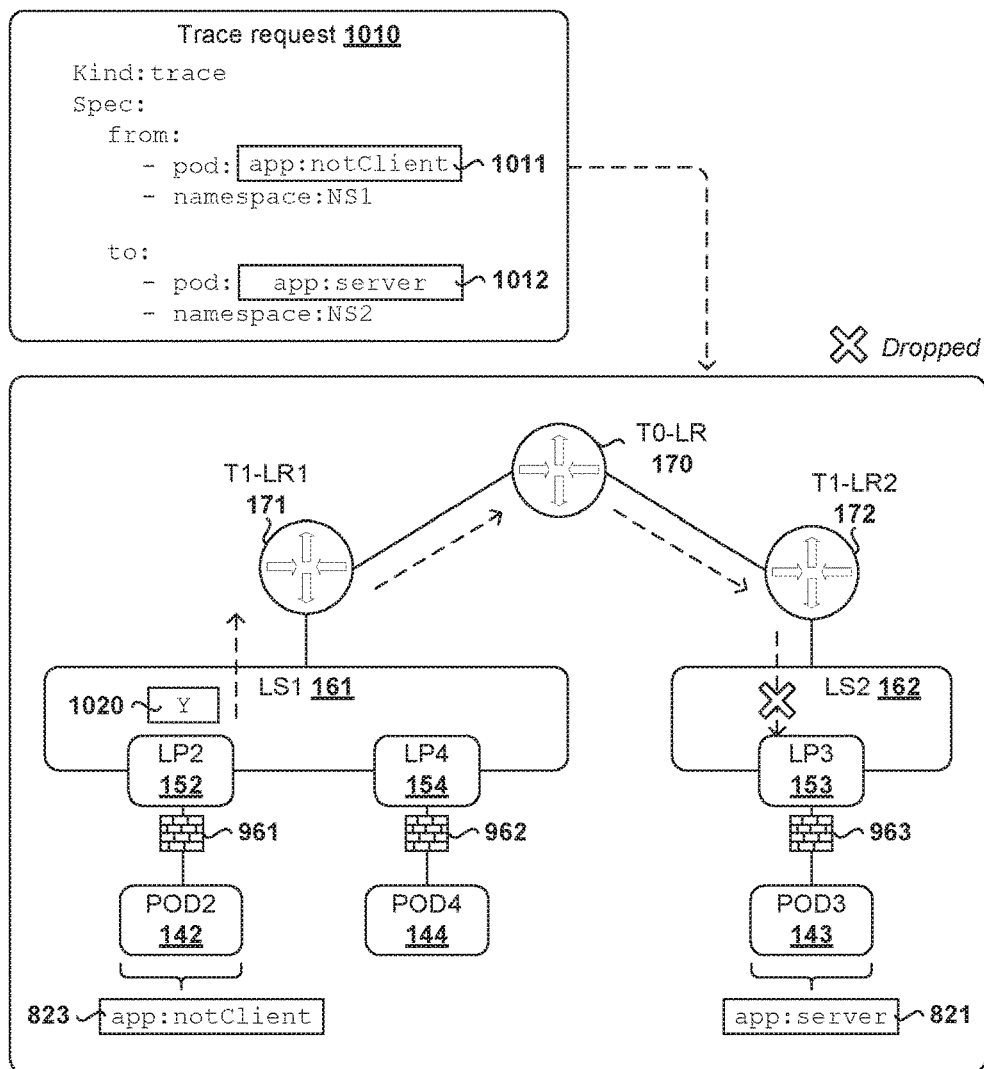
FIG. 10 is a schematic diagram illustrating a second example of container-based connectivity check in an SDN environment.

FIG. 10 which is a schematic diagram illustrating second example 1000 of container-based connectivity check in SDN environment 100. At 1010 in FIG. 10, container plugin 110 may detect a second trace request to initiate a connectivity check between POD2 142 and POD3 143. Trace request 1010 may select source=POD2 142 in namespace=NS1 using a pod selector with label="app: notClient" (see 1011). Destination=POD3 143 in namespace=NS2 may be selected using a pod selector identifying label="app: server" (see 1012). In response to detecting trace request 1010, container plugin 110 may select source=LP2 152 based on label="app: client" (see 823) assigned to LP2 152. Similarly, destination=LP3 153 may be selected based on label="app: server" (see 821) assigned to LP3 153.

At 1020 in FIG. 10, a second connectivity check packet (labelled "Y") may be injected at LP2 152 for forwarding towards LP3 153 via a datapath that includes LS1 161, T1-LR1 171, T0-LR 170, T1-LR2 172 and LS2 162 ("intermediate logical network elements"). At 1030, container plugin 110 may obtain report information specifying the following: "INJECTED" at LP2 152 (see 1031), "RECEIVED+FORWARDED" by LS1 (see 1032), T1-LR1 171 (see 1033), T0-LR 170 (see 1034), T1-LR2 172 (see 1035) and LS2 162 (see 1036). The report information also indicates that the connectivity check packet is DROPPED (see 1037) at LP3 153. In this case, it is determined that LP2 152 has no connectivity with LP3 153.

At 1040 in FIG. 10, container plugin 110 may generate a trace result that identifies a network policy that is applicable to connectivity check packet 1020. In this case, container plugin 110 may identify the network policy ("allow-client") configured in the example in FIG. 8 based on label (or tag or metadata) associated with the firewall rule traversed, such as "networkPolicy: allow-client" assigned to firewall rule 860 in FIG. 8). Firewall rule 860 is configured based on request 830 to block traffic to LP3 153 from any other source (e.g., LP2 152) that does not belong to source group={LP4 154}, nor tagged with label="app: client."

Trace result 1040 may specify a list of container-based resources traversed by the connectivity check packet, i.e., source POD4 144 in namespace=NS1, network policy="allow-client" that configured for NS1 and destination POD2 142 in namespace=NS2. Trace result 1040 may specify a list of logical network elements traversed by the connectivity check packet, i.e., LP2 152, LS1 161, T1-LR1 171, T0-LR 170, T1-LR2 172, LS2 162 and LP3 153.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 10. For example, the instructions or program code, when executed by the processor of the computer system, may cause the processor to perform network troubleshooting according to examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a computer system to perform container-based network policy configuration in a software-defined networking (SDN) environment, wherein the method comprises:
   in response to detecting a first request to assign a container-based resource with a first label via a container orchestration system, assigning a logical network element associated with the container-based resource with a second label; and
   in response to detecting a second request to configure a container-based network policy associated with the container-based resource via the container orchestration system,
      identifying the logical network element by mapping the first label assigned to the container-based resource to the second label assigned to the logical network element; and
      configuring the container-based network policy to be applicable to network traffic that is forwarded via the logical network element.

2. The method of claim 1, wherein assigning the logical network element with the second label comprises:
   based on the first label that specifies a key-value pair associated with the container-based resource, assigning the logical network element with the second label that also specifies the key-value pair.

3. The method of claim 1, wherein detecting the second request comprises:
   detecting the second request in the form of a custom resource definition (CRD) that selects the container-based resource using the first label.

4. The method of claim 1, wherein identifying the logical network element comprises:
   mapping (a) the first label assigned to the container-based resource in the form of a node to (b) the second label assigned to the logical network element in the form of a logical switch port that connects the node to a logical switch.

5. The method of claim 1, wherein identifying the logical network element comprises:
   mapping (a) the first label assigned to the container-based resource in the form of a pod of one or more containers to (b) the second label assigned to the logical network element in the form of a logical switch port that connects the pod to a logical switch.

6. The method of claim 1, wherein configuring the container-based network policy cause the processor to:
   configuring the container-based network policy in the form of a firewall rule to allow or block traffic between the container-based resource and a second container-based resource.

7. The method of claim 6, wherein the method further comprises:
   configuring the firewall rule to allow or block traffic between (a) a first group that includes the logical network element and (b) a second group that includes a second logical network element associated with the second container-based resource.

8. A non-transitory computer-readable storage medium that includes a set of instructions which, in response to execution by a processor of a computer system, cause the processor to perform a method of container-based network policy configuration in a software-defined networking (SDN) environment, wherein the method comprises:
   in response to detecting a first request to assign a container-based resource with a first label via a container orchestration system, assigning a logical network element associated with the container-based resource with a second label; and
   in response to detecting a second request to configure a container-based network policy associated with the container-based resource via the container orchestration system,
      identifying the logical network element by mapping the first label assigned to the container-based resource to the second label assigned to the logical network element; and
      configuring the container-based network policy to be applicable to network traffic that is forwarded via the logical network element.

9. The non-transitory computer-readable storage medium of claim 8, wherein assigning the logical network element with the second label comprises:
   based on the first label that specifies a key-value pair associated with the container-based resource, assigning the logical network element with the second label that also specifies the key-value pair.

10. The non-transitory computer-readable storage medium of claim 8, wherein detecting the second request comprises:
   detecting the second request in the form of a custom resource definition (CRD) that selects the container-based resource using the first label.

11. The non-transitory computer-readable storage medium of claim 8, wherein identifying the logical network element comprises:
   mapping (a) the first label assigned to the container-based resource in the form of a node to (b) the second label assigned to the logical network element in the form of a logical switch port that connects the node to a logical switch.

12. The non-transitory computer-readable storage medium of claim 8, wherein identifying the logical network element comprises:
   mapping (a) the first label assigned to the container-based resource in the form of a pod of one or more containers to (b) the second label assigned to the logical network element in the form of a logical switch port that connects the pod to a logical switch.

13. The non-transitory computer-readable storage medium of claim 8, wherein configuring the container-based network policy cause the processor to:
   configuring the container-based network policy in the form of a firewall rule to allow or block traffic between the container-based resource and a second container-based resource.

14. The non-transitory computer-readable storage medium of claim 13, wherein the method further comprises:
   configuring the firewall rule to allow or block traffic between (a) a first group that includes the logical network element and (b) a second group that includes a second logical network element associated with the second container-based resource.

15. A computer system, comprising:
a processor; and
a non-transitory computer-readable medium having stored thereon instructions that, when executed by the processor, cause the processor to:
in response to detecting a first request to assign a container-based resource with a first label via a container orchestration system, assigning a logical network element associated with the container-based resource with a second label; and
in response to detecting a second request to configure a container-based network policy associated with the container-based resource via the container orchestration system,
identifying the logical network element by mapping the first label assigned to the container-based resource to the second label assigned to the logical network element; and
configuring the container-based network policy to be applicable to network traffic that is forwarded via the logical network element.

16. The computer system of claim 15, wherein the instructions for assigning the logical network element with the second label cause the processor to:
based on the first label that specifies a key-value pair associated with the container-based resource, assign the logical network element with the second label that also specifies the key-value pair.

17. The computer system of claim 15, wherein the instructions for detecting the second request cause the processor to:
detect the second request in the form of a custom resource definition (CRD) that selects the container-based resource using the first label.

18. The computer system of claim 15, wherein the instructions for identifying the logical network element cause the processor to:
map (a) the first label assigned to the container-based resource in the form of a node to (b) the second label assigned to the logical network element in the form of a logical switch port that connects the node to a logical switch.

19. The computer system of claim 15, wherein the instructions for identifying the logical network element cause the processor to:
map (a) the first label assigned to the container-based resource in the form of a pod of one or more containers to (b) the second label assigned to the logical network element in the form of a logical switch port that connects the pod to a logical switch.

20. The computer system of claim 15, wherein the instructions for configuring the container-based network policy cause the processor to:
configure a network policy in the form of a firewall rule to allow or block traffic between the container-based resource and a second container-based resource.

21. The computer system of claim 20, wherein the instructions further cause the processor to:
configure the firewall rule to allow or deny communication between (a) a first group that includes the logical network element and (b) a second group that includes a second logical network element associated with the second container-based resource.

* * * * *